United States Patent
Hu

(10) Patent No.: US 10,902,230 B2
(45) Date of Patent: Jan. 26, 2021

(54) METHOD AND APPARATUS FOR PRESENTING GRAPHIC CODES

(71) Applicant: ALIBABA GROUP HOLDING LIMITED, George Town (KY)

(72) Inventor: Feihu Hu, Hangzhou (CN)

(73) Assignee: ALIBABA GROUP HOLDING LIMITED, Grand Cayman (KY)

(*) Notice: Subject to any disclaimer, the term of this patent is extended or adjusted under 35 U.S.C. 154(b) by 0 days.

(21) Appl. No.: 16/944,927

(22) Filed: Jul. 31, 2020

(65) Prior Publication Data

US 2020/0364422 A1 Nov. 19, 2020

Related U.S. Application Data

(63) Continuation of application No. PCT/CN2019/099407, filed on Aug. 6, 2019.

(30) Foreign Application Priority Data

Sep. 29, 2018 (CN) .......................... 2018 1 1152166

(51) Int. Cl.
*G06K 7/10* (2006.01)
*G06K 7/14* (2006.01)
(Continued)

(52) U.S. Cl.
CPC ....... *G06K 7/10722* (2013.01); *G06K 7/1417* (2013.01); *G09G 5/38* (2013.01);
(Continued)

(58) Field of Classification Search
CPC ... G06K 7/10722; G06K 7/1417; G06Q 20/18
(Continued)

(56) References Cited

U.S. PATENT DOCUMENTS

| 2014/0267023 A1 | 9/2014 | Kim et al. |
| 2014/0364148 A1* | 12/2014 | Block ............... H04M 1/72597 455/456.3 |

(Continued)

FOREIGN PATENT DOCUMENTS

| CN | 101893933 A | 11/2010 |
| CN | 105138942 A | 12/2015 |

(Continued)

OTHER PUBLICATIONS

International Search Report and Written Opinion (English Translation), dated Oct. 29, 2019 for International Application No. PCT/CN2019/099407, 6 pages.

(Continued)

*Primary Examiner* — Allyson N Trail
(74) *Attorney, Agent, or Firm* — Seed IP Law Group LLP

(57) ABSTRACT

The present application provides a method and apparatus for presenting a graphic code. The method includes: after detecting that a graphic code page is invoked, starting a front-facing image capture module of a current device to perform image capturing; performing image recognition on a captured image, and if the captured image includes a pre-configured feature of a code scanning module, calculating an offset distance between the code scanning module and a current presentation location of a graphic code; and calculating a target presentation location based on the offset distance, and presenting the graphic code at the target presentation location. Based on the method provided in the present application, a location of a graphic code can be adapted automatically, and a user does not need to perform alignment, thereby improving user experience.

17 Claims, 4 Drawing Sheets

(51) Int. Cl.
  *G09G 5/38* (2006.01)
  *G06Q 20/18* (2012.01)
  *G06Q 20/04* (2012.01)
  *G06Q 20/32* (2012.01)

(52) U.S. Cl.
  CPC ......... *G06Q 20/0457* (2013.01); *G06Q 20/18* (2013.01); *G06Q 20/3274* (2013.01); *G09G 2340/0464* (2013.01)

(58) Field of Classification Search
  USPC ........................................ 235/462.41, 462.2
  See application file for complete search history.

(56) References Cited

U.S. PATENT DOCUMENTS

2015/0317060 A1* 11/2015 Debets ............... G06Q 30/0267
                                                            715/835
2016/0034775 A1  2/2016 Meadow et al.
2018/0253577 A1* 9/2018 Moriyama ............. H04N 1/047
2019/0259354 A1* 8/2019 Liu ....................... G06K 7/1417
2020/0092272 A1* 3/2020 Eisen .................. H04L 63/0876

FOREIGN PATENT DOCUMENTS

| CN | 107016125 A | 8/2017 |
| CN | 107194690 A | 9/2017 |
| CN | 107577973 A | 1/2018 |
| CN | 107578245 A | 1/2018 |
| CN | 107609437 A | 1/2018 |
| CN | 109615360 A | 4/2019 |

OTHER PUBLICATIONS

Chinese Office Action (English Translation), dated Feb. 20, 2020, for Chinese Application No. 201811152166.X, 7 pages.

* cited by examiner

METHOD AND APPARATUS FOR PRESENTING GRAPHIC CODES

BACKGROUND

Technical Field

The present specification relates to the field of Internet technologies, and in particular, to methods and apparatuses for presenting graphic codes.

Description of the Related Art

In modern daily life, it is very common that a graphic code presented on a mobile phone is scanned using a code scanning terminal device to complete functions such as payment, ticket collection, and mutual addition of friends. Generally, it is necessary to place the mobile phone close to the code scanning terminal device, and align the graphic code presented on the mobile phone with a code scanning module of the code scanning terminal device to complete information reading. For example, after a movie ticket is purchased using an APP on the mobile phone, it is necessary to align a graphic code presented on the mobile phone with a code scanning module of a ticket issuing terminal device on the spot to complete scanning and collection of the movie ticket.

Generally, a location of the graphic code presented on the mobile phone relative to a screen of the mobile phone is fixed. A user is required to first determine a location where the graphic code is currently displayed on the mobile phone and accurately place the displayed graphic code within a scanning area of the code scanning module of the code scanning terminal device to successfully scan the code. In addition, some baffles designed to protect code scanning modules exist on some code scanning terminal devices, so some large mobile phones cannot be placed very well and perform code scanning very well, resulting in poor user experience.

BRIEF SUMMARY

Implementations of the present specification provide methods and apparatuses for presenting graphic codes. Technical solutions are as follows.

According to a first aspect of the implementations of the present specification, a method for presenting a graphic code is provided.

The method includes:

after detecting that a graphic code page is invoked, starting a front-facing image capture module of a current device to perform image capturing;

performing image recognition on a captured image, and if the captured image includes a pre-configured feature of a code scanning module, calculating an offset distance between the code scanning module and a current presentation location of a graphic code; and calculating a target presentation location based on the offset distance, and presenting the graphic code at the target presentation location.

According to a second aspect of the implementations of the present specification, an apparatus for presenting a graphic code is provided, including: an image capture module, configured to:

after detecting that a graphic code page is invoked, start a front-facing image capture module of a current device to perform image capturing;

an offset calculation module, configured to perform image recognition on a captured image, and if the captured image includes a pre-configured feature of a code scanning module, calculate an offset distance between the code scanning module and a current presentation location of a graphic code; and a calculation and presentation module, configured to calculate a target presentation location based on the offset distance, and present the graphic code at the target presentation location.

According to a third aspect of the implementations of the present specification, a computer device is provided, including at least a memory, a processor, and a computer program that is stored on the memory and that can run on the processor, the processor implementing a method for presenting a graphic code when executing the program, and the method including at least:

after detecting that a graphic code page is invoked, starting a front-facing image capture module of a current device to perform image capturing;

performing image recognition on a captured image, and if the captured image includes a pre-configured feature of a code scanning module, calculating an offset distance between the code scanning module and a current presentation location of a graphic code; and calculating a target presentation location based on the offset distance, and presenting the graphic code at the target presentation location.

In the technical solutions provided in the implementations of the present specification, a method for presenting a graphic code is provided. Based on the method provided in the present specification, an image is captured by using a front-facing camera module, and it is determined whether the image includes a code scanning module of a code scanning device. After the code scanning module is determined, a graphic code is correspondingly presented at a location of the code scanning module. Compared with the presentation location of the graphic code in the existing technology, in the method provided in the present specification, the location of the graphic code can be adapted automatically, and a user does not need to perform alignment, thereby improving user experience.

It should be understood that the general descriptions above and the detailed descriptions below are merely examples and illustrative, and cannot limit the implementations of the present specification.

In addition, any one of the implementations of the present specification does not need to achieve all the effects above.

BRIEF DESCRIPTION OF DRAWINGS

To describe the technical solutions in the implementations of the present specification or in the existing technologies more clearly, the following briefly describes the accompanying drawings used for describing the implementations or the existing technologies. Clearly, the accompanying drawings in the following descriptions merely show some implementations of the present specification, and a person of ordinary skill in the art can still derive other drawings from these accompanying drawings.

DETAILED DESCRIPTION

Example implementations are described in detail herein, and examples of the example implementations are presented in the accompanying drawings. When the following descriptions relate to the accompanying drawings, unless specified otherwise, same numbers in different accompanying drawings represent same or similar elements. Implementations described in the following example implementations do not represent all implementations consistent with the present specification. On the contrary, the implementations are merely examples of apparatuses and methods that are described in the appended claims in detail and consistent with some aspects of the present specification.

The terms used in the present specification are merely for illustrating specific implementations, and are not intended to limit the present specification. The terms "a" and "the" of singular forms used in the present specification and the appended claims are also intended to include plural forms, unless otherwise specified in the context clearly. It should be further understood that the term "and/or" used in the present specification indicates and includes any or all possible combinations of one or more associated items as listed.

It should be understood that although terms "first," "second," "third," etc., may be used in the present specification to describe various types of information, the information is not limited to the terms. These terms are merely used to differentiate between information of the same type. For example, without departing from the scope of the present specification, first information can also be referred to as second information, and similarly, the second information can be referred to as the first information. Depending on the context, for example, the word "if" used herein can be interpreted as "while", "when", or "in response to determining".

Figure 1:
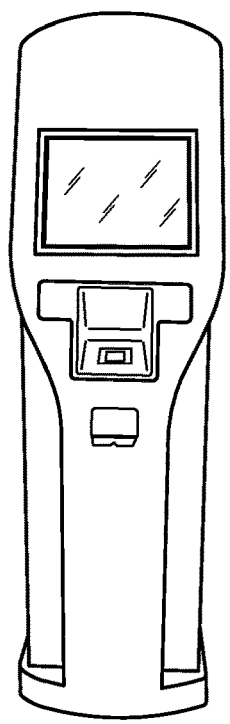
FIG. 1 is a schematic diagram illustrating a code scanning terminal device according to an example implementation of the present specification.

In modern daily life, it is very common that a graphic code presented, e.g., displayed on a screen, on a mobile phone is scanned using a code scanning terminal device, e.g., as shown in FIG. 1, to complete functions such as payment, ticket collection, and mutual addition of friends. Generally, it is necessary to place the mobile phone close to the code scanning terminal device, and align the graphic code presented on the mobile phone with a code scanning module of the code scanning terminal device to complete information reading. For example, after a movie ticket is purchased using an APP on the mobile phone, it is necessary to align a graphic code presented on the mobile phone with a code scanning module of a ticket issuing terminal device on the spot to complete scanning and collection of the movie ticket.

Generally, a location of the graphic code presented on the mobile phone relative to a screen of the mobile phone is fixed. A user is required to first determine a location or an area in which the graphic code on the mobile phone is located and accurately place the graphic code within a scanning area and/or range of the code scanning module of the code scanning terminal device to successfully scan the code. In addition, some baffles designed to protect code scanning modules exist on some code scanning terminal devices, so some large mobile phones cannot be placed very well and perform code scanning very well, resulting in poor user experience.

Figure 2:
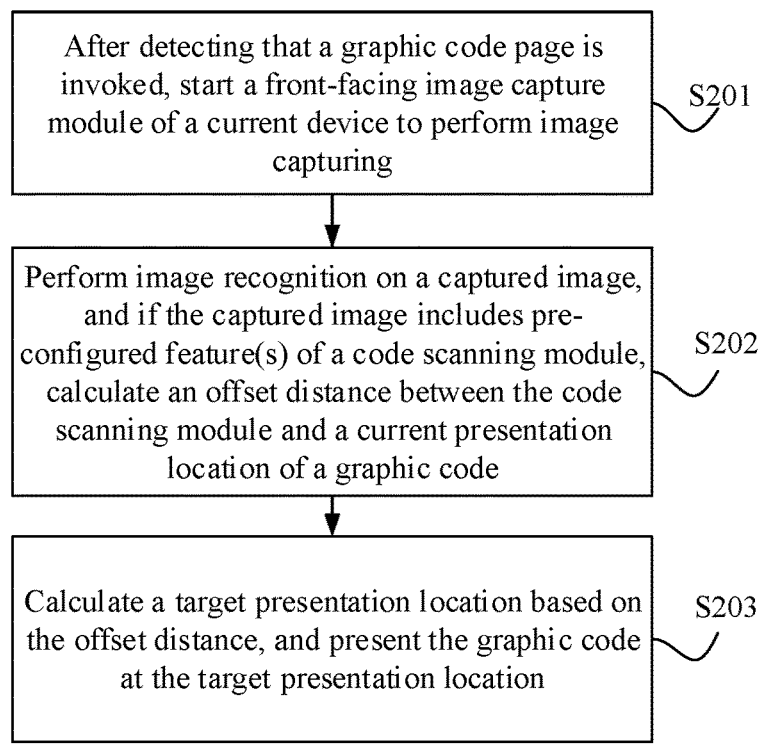
FIG. 2 is a flowchart illustrating a method for presenting a graphic code according to an example implementation of the present specification.

To address the problem(s) above, implementations of the present specification provide a method for presenting a graphic code and an apparatus for presenting a graphic code used to execute the method. The following describes in detail the method for presenting a graphic code in the implementations. Referring to FIG. 2, the method can include the following steps.

S201. After detecting that a graphic code page is invoked, start a front-facing image capture module of a current device to perform image capturing.

In the present specification, a graphic code is a digital object identifier including a two-dimensional code, a bar code, a character code, or a network domain name. In modern daily life, a two-dimensional code is most widely used. For example, an application scenario of the two-dimensional code is as follows: after a movie ticket is purchased, a ticket purchasing APP generates a specific two-dimensional code for ticket collection, and a user only needs to present the two-dimensional code at a code scanning module of a ticket collection device on the spot to collect the movie ticket. The following descriptions of the present specification also use two-dimensional code as a representative of graphic code.

When the user opens a two-dimensional code page for presentation, it can be considered that the two-dimensional code page is invoked on a client device. At this moment, the front-facing image capture module of the current device can be started, for example, a front-facing camera of the mobile phone can be started to capture an image in front of the mobile phone.

Considering that some devices may not have a front-facing image capture module, a determining step can be added after it is detected that the graphic code page is invoked: first determining whether the current device has a front-facing image capture module, and if the current device does not have a front-facing image capture module, stopping the process of this implementation, or presenting a two-dimensional code using another method.

S202. Perform image recognition on a captured image, and if the captured image includes pre-configured or dynamically-determined feature(s) of a code scanning module, calculate an offset distance between the code scanning module and a current presentation location of a graphic code.

Specifically, before image recognition, a plurality of pieces of feature information about the code scanning module can be stored on a server or the client device in advance, and the feature information are matched with the captured image, to determine whether the captured image includes one of the plurality of pieces of feature information.

Further, the timing to end image capturing can be determined. Generally, when the user does not move the device while holding the device steadily, the image captured at this moment can be used for image recognition, and the offset distance between the code scanning module and the current presentation location of the graphic code is determined. In this case, the offset distance is relatively stable and does not change substantially, e.g., beyond a threshold. As such, it can be detected whether the current device is in a still state. When the device is in a still state and remains in the still state for a duration that exceeds a predetermined or dynamically-generated threshold, image capturing can be ended, and image recognition can be performed on the captured image.

Similarly, considering that some devices may not have sensors that sense the states of these devices, the timing to end image capturing can be determined using another method: continuously performing image capturing, e.g., at a rapid rate that is predetermined or dynamically-determined, and calculating respective offset distances between the code scanning module in different images, e.g., images captured within a most recent period of time such as most recent 2 seconds, 1 second, or 0.5 second, and the current presentation location of the graphic code; and if the difference between a number of the calculated offset distances is within a predetermined or dynamically-generated threshold, e.g., the calculated offset distances within the most recent period of time are within a threshold difference from one another, ending the image capturing, and calculating the target presentation location.

Further, in some cases, the user may place the device at a location deviating from the code scanning module of a code scanning terminal to a large degree, that is, neither the two-dimensional code is aligned with the code scanning module, nor the code scanning module is located in a field of view of the front-facing camera module. In this case, a prompt can be provided to the user. Specifically, after it is determined that the user invokes the two-dimensional code page and steadily holds the device, if the two-dimensional code is not scanned successfully and the captured image after image recognition does not include feature(s) of the code scanning module, a prompt function is enabled, and the user is prompted to place the device again through voice playback or device vibration.

Further, sensor module(s) can also be added around the code scanning module of the code scanning terminal. After user equipment is moved to deviate from the code scanning module, based on detection using the sensor module(s) of the code scanning terminal, voice prompts can be directly provided to prompt the user to move the user equipment upwards/downwards/leftward/rightwards.

S203. Calculate a target presentation location based on the offset distance, and present the graphic code at the target presentation location.

Figure 3:
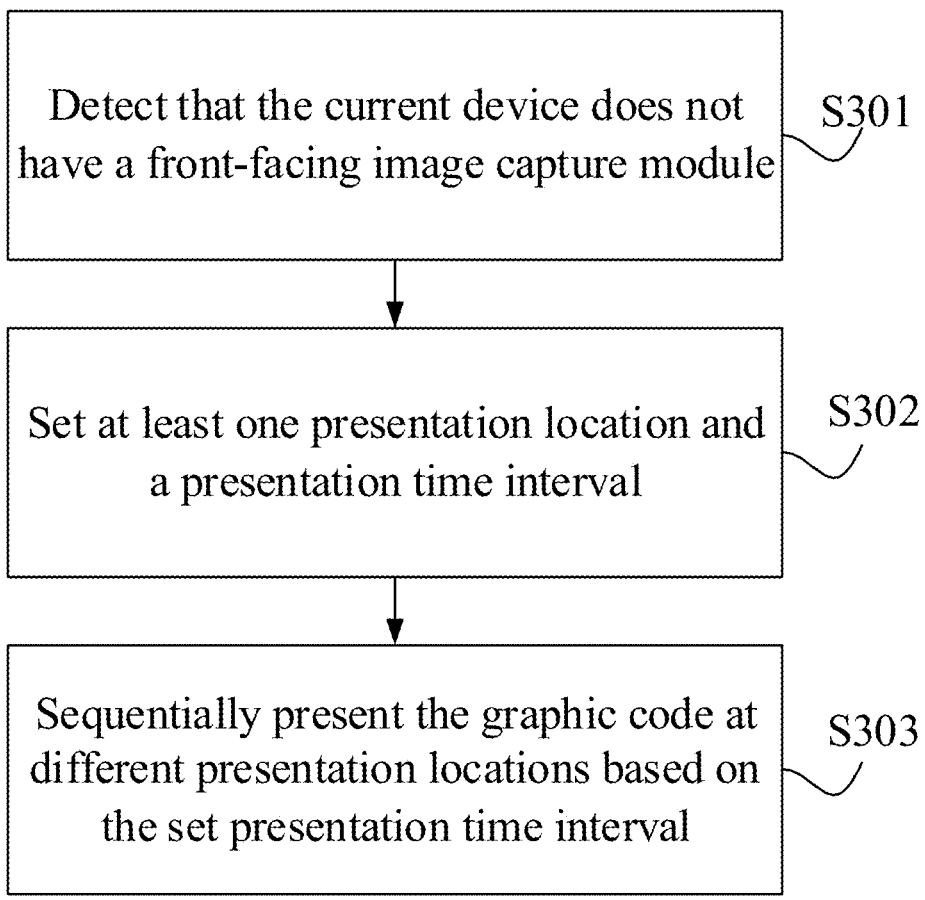
FIG. 3 is another flowchart illustrating a method for presenting a graphic code according to an example implementation of the present specification.

In some cases, the device may not have a front-facing image capture module. As such, the present specification further provides a method for presenting a graphic code used when the current device does not have a front-facing image capture module. Specifically, referring to FIG. 3, the method includes the following steps.

S301. Detect that the current device does not have a front-facing image capture module.

S302. Set at least one presentation location and a presentation time interval.

S303. Sequentially present the graphic code at different presentation locations based on the set presentation time interval.

For example, a central axis of the device can be set as a presentation route, a plurality of presentation locations are set along the central axis, and the two-dimensional code are sequentially presented at the locations according to the set time interval. The user only needs to place the device approximately at the code scanning module and wait for a while, and the two-dimensional code on the screen can move itself and finally align with the code scanning module. Alternatively or in addition, a straight line, curve, circle, or other shape in any predetermined or dynamically-determined direction can be used as the presentation route. The presentation time interval may be fixed or may vary. For example, the presentation time interval may vary depending on the location and/or orientation of the displayed code, how long has the code being presented without achieving a successful scan by the scanning module, or the like.

Figure 4:
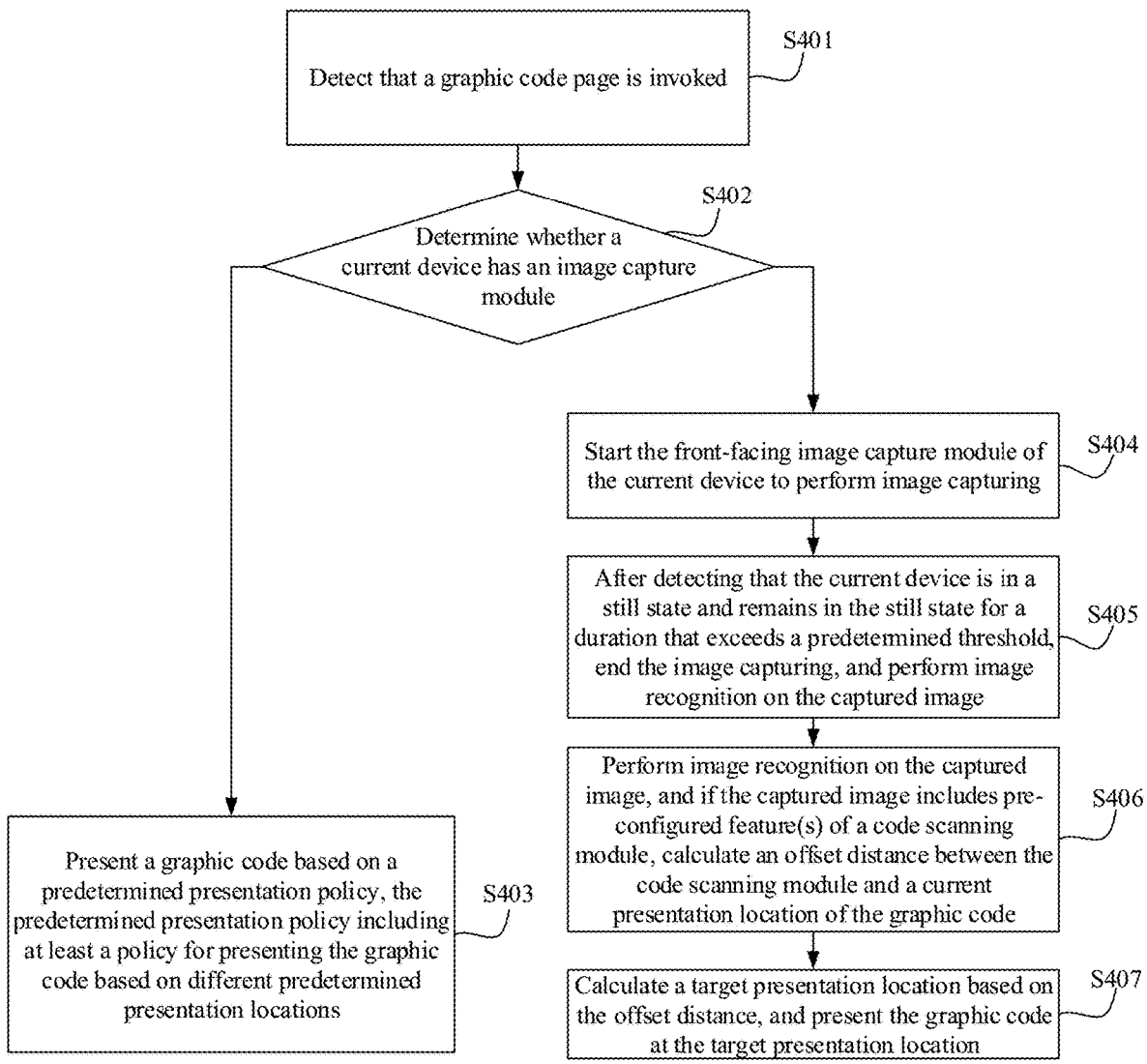
FIG. 4 is another flowchart illustrating a method for presenting a graphic code according to an example implementation of the present specification.

An implementation of the present specification further provides a more specific method for presenting a graphic code. Referring to FIG. 4, the method can include the following steps.

S401. Detect that a graphic code page is invoked.

S402. Determine whether a current device has an image capture module.

S403. Present a graphic code based on a predetermined or dynamically-generated presentation policy, the predetermined or dynamically-generated presentation policy including at least a policy for presenting the graphic code based on different predetermined or dynamically-generated presentation locations.

S404. Start the front-facing image capture module of the current device to perform image capturing.

S405. After detecting that the current device is in a still state and remains in the still state for a duration that exceeds a predetermined or dynamically-generated threshold, end the image capturing, and perform image recognition on the captured image.

S406. Perform image recognition on the captured image, and if the captured image includes pre-configured feature(s) of a code scanning module, calculate an offset distance between the code scanning module and a current presentation location of the graphic code.

S407. Calculate a target presentation location based on the offset distance, and present the graphic code at the target presentation location.

Figure 5:
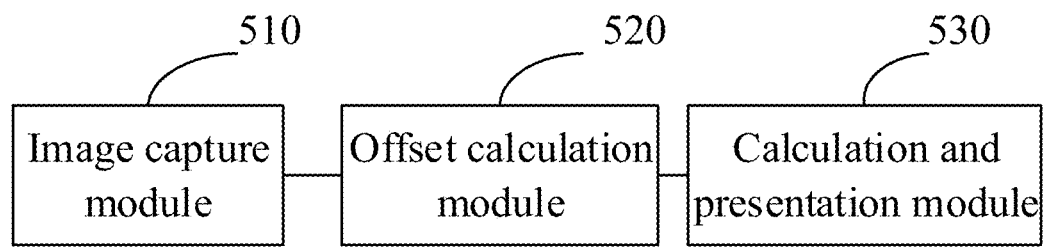
FIG. 5 is a schematic diagram illustrating an apparatus for presenting a graphic code according to an example implementation of the present specification.

Corresponding to the method implementations above, an implementation of the present specification further provides an apparatus for presenting a graphic code. Referring to FIG. 5, the apparatus can include an image capture module 510, an offset calculation module 520, and a calculation and presentation module 530.

The image capture module 510 is configured to: after detecting that a graphic code page is invoked, start a front-facing image capture module of a current device to perform image capturing.

The offset calculation module 520 is configured to perform image recognition on a captured image, and if the captured image includes pre-configured feature(s) of a code scanning module, calculate an offset distance between the code scanning module and a current presentation location of a graphic code.

The calculation and presentation module 530 is configured to calculate a target presentation location based on the offset distance, and present the graphic code at the target presentation location.

An implementation of the present specification further provides a computer device. The computer device includes at least a memory, a processor, and a computer program that is stored on the memory and that can run on the processor. The processor implements the method for presenting a graphic code when executing the program. The method includes at least:

after detecting that a graphic code page is invoked, starting a front-facing image capture module of a current device to perform image capturing;

performing image recognition on a captured image, and if the captured image includes pre-configured feature(s) of a code scanning module, calculating an offset distance between the code scanning module and a current presentation location of a graphic code; and calculating a target presentation location based on the offset distance, and presenting the graphic code at the target presentation location.

Figure 6:
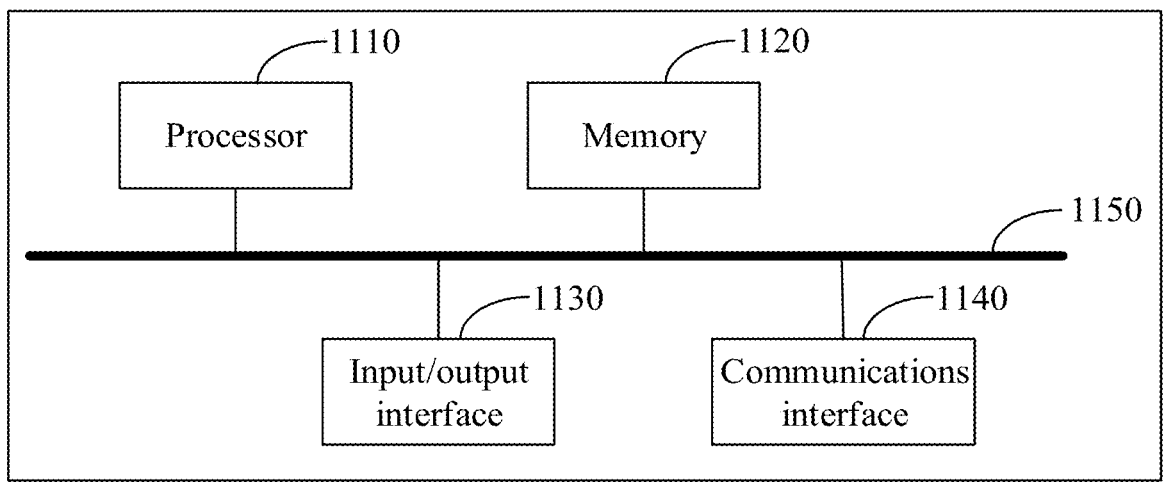
FIG. 6 is a schematic structural diagram illustrating a computer device according to an example implementation of the present specification.

FIG. 6 is a more detailed schematic diagram illustrating a hardware structure of a computing device according to an implementation of the present specification. The device can include a processor 1110, a memory 1120, an input/output interface 1130, a communications interface 1140, and a bus 1150. The processor 1110, the memory 1120, the input/output interface 1130, and the communications interface 1140 are communicatively connected to each other inside the device by using the bus 1150.

The processor 1110 can be implemented using a general central processing unit (CPU), a microprocessor, an application-specific integrated circuit (ASIC), one or more integrated circuits, etc., and is configured to execute a related program, to implement the technical solutions provided in the implementations of the present specification.

The memory 1120 can be implemented using a read-only memory (ROM), a random access memory (RAM), a static storage device, a dynamic storage device, etc. The memory 1120 can store an operating system and another application program. When the technical solutions provided in the implementations of the present specification are implemented using software or firmware, related program code is stored on the memory 1120, and is invoked and executed by the processor 1110.

The input/output interface 1130 is configured to be connected to an input/output module, to input or output information. The input/output module (not shown in the figure) can be used as a component and configured in the device, or can be externally connected to the device to provide a corresponding function. The input device can include a keyboard, a mouse, a touchscreen, a microphone, various sensors, etc. The output device can include a monitor, a speaker, a vibrator, an indicator, etc.

The communications interface 1140 is configured to be connected to a communications module (not shown in the figure), to implement a communication interaction between the device and another device. The communications module can perform communication in a wired method, e.g., USB or a network cable, or can perform communication in a wireless method, e.g., a mobile network, Wi-Fi, or Bluetooth.

The bus 1150 includes one channel, used to transmit information between components, e.g., the processor 1110, the memory 1120, the input/output interface 1130, and the communications interface 1140, of the device.

It should be noted that although only the processor 1110, the memory 1120, the input/output interface 1130, the communications interface 1140, and the bus 1150 of the device are shown, during specific implementation(s), the device can further include other components needed for implementing normal running. In addition, a person skilled in the art can understand that the device can include only components necessary for implementing the solutions in the implementations of the present specification, but does not necessarily include all components shown in the figure.

An implementation of the present specification further provides a computer readable storage medium on which a computer program is stored. The program implements the method for presenting a graphic code when being executed by a processor, and the method includes at least:

after detecting that a graphic code page is invoked, starting a front-facing image capture module of a current device to perform image capturing;

performing image recognition on a captured image, and if the captured image includes pre-configured feature(s) of a code scanning module, calculating an offset distance between the code scanning module and a current presentation location of a graphic code; and calculating a target presentation location based on the offset distance, and presenting the graphic code at the target presentation location.

The computer readable medium includes persistent, non-persistent, movable, and unmovable media that can store information by using any method or technology. The information can be a computer readable instruction, a data structure, a program module, or other data. Examples of the computer storage medium include, but are not limited to, a phase change random access memory (PRAM), a static random access memory (SRAM), a dynamic random access memory (DRAM), another type of RAM, a ROM, an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, another magnetic storage device, or any other non-transmission medium. The computer storage medium can be used to store information accessible by a computing device. Based on the definition in the present specification, the computer readable medium does not include transitory media such as a modulated data signal and carrier.

Because an apparatus implementation corresponds to a method implementation, for related parts, references can be made to related descriptions in the method implementation. The apparatus implementation described above is merely an example. The units described as separate parts may or may not be physically separate, and parts displayed as units may or may not be physical units, may be located in one position, or may be distributed on a plurality of network units. Some or all of the modules can be selected based on actual needs to achieve the objectives of the solutions of the present specification. A person of ordinary skill in the art can understand and implement the implementations of the present application without creative efforts.

It can be understood from the descriptions of the implementations that, a person skilled in the art can clearly understand that the implementations of the present specification can be implemented by using software and a necessary general hardware platform. Based on such an understanding, the technical solutions in the implementations of the present specification essentially or the part contributing to the existing technology can be implemented in a form of a software product. The computer software product can be stored in a storage medium, such as a ROM/RAM, a magnetic disk, or an optical disc, and includes several instructions for instructing a computer device, which can be a personal computer, a server, a network device, etc., to execute the method described in the implementations of the present specification or in some parts of the implementations of the present specification.

The system, apparatus, module, or unit illustrated in the implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

The implementations of the present specification are described in a progressive method. For same or similar parts of the implementations, references can be made to the implementations. Each implementation focuses on a difference from other implementations. Particularly, an apparatus implementation is similar to a method implementation, and therefore is described briefly. For related parts, references can be made to some descriptions in the method implementation. The apparatus implementation described above is merely an example. The modules described as separate parts may or may not be physically separate. During implementation of the solutions in the implementations of the present application, functions of the modules can be implemented in one or more pieces of software and/or hardware. Some or all of the modules can be selected based on an actual need to implement the solutions in the implementations. A person of ordinary skill in the art can understand and implement the implementations of the present application without creative efforts.

The previous descriptions are merely specific implementations of the implementations of the present application. It should be noted that a person of ordinary skill in the art can further make several improvements or polishing without departing from the principles of the implementations of the present specification, and the improvements or polishing shall fall within the protection scope of the implementations of the present specification.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for presenting a graphic code, comprising: detecting that a graphic code page is invoked on a device, the graphic code page including a graphic code; capturing an image using the device; determining that the captured image includes a feature of a code scanning module by performing image recognition on the captured image; calculating an offset distance between the code scanning module and a location of the graphic code as currently presented on the device, wherein the capturing an image, the determining that the image includes the feature of the code scanning module, and the calculating an offset distance are performed repeatedly; determining that a difference between a number of calculated offset distances is within a threshold; in response to the determining that the difference between the number of calculated offset distances is within the threshold, calculating a target location for presenting the graphic code on the device based, at least in part, on the offset distance; and presenting the graphic code at the target location.

2. The method according to claim 1, wherein the capturing an image includes: detecting that the device is in a still state and remains in the still state for a duration that exceeds a threshold; and wherein the performing image recognition is conducted responsive to the detecting.

3. The method according to claim 1, wherein the capturing an image includes:
responsive to the detecting that the graphic code page is invoked, determining whether the device has a front-facing image capture module; and responsive to determining that the device has the front-facing image capture module, starting the front-facing image capture module to perform image capturing.

4. The method according to claim 1, wherein the capturing an image includes:
responsive to detecting that the graphic code page is invoked, determining whether the device has a front-facing image capture module; and responsive to determining that the mobile device does not have a front-facing image capture module, presenting the graphic code based on a presentation policy, the presentation policy including at least a policy for presenting the graphic code based on different presentation locations.

5. The method according to claim 4, wherein presenting the graphic code based on the presentation policy includes: moving and presenting the graphic code up and down along a central symmetry axis of the device based on a speed.

6. The method according to claim 4, wherein presenting the graphic code based on the presentation policy includes: setting a plurality of presentation locations and a presentation time interval; and presenting the graphic code at different presentation locations of the plurality of presentation locations based on the set presentation time interval.

7. An apparatus for presenting a graphic code, comprising: an image capture module, configured to: detect that a graphic code page is invoked on the apparatus, the graphic code page including a graphic code; and capture an image; an offset calculation module, configured to: detect that the apparatus is in a still state and remains in the still state for a duration that exceeds a threshold; determine that the captured image includes a feature of a code scanning module by performing image recognition on a captured image, wherein the performing image recognition is responsive to the detecting that the apparatus is in a still state and remains in the still state for a duration that exceeds a threshold; and calculate an offset distance between the code scanning module and a location of the graphic code as currently presented on the apparatus; and a calculation and presentation module, configured to: calculate a target location for presenting the graphic code on the apparatus based, at least in part, on the offset distance; and present the graphic code at the target location.

8. The apparatus according to claim 7, wherein the offset calculation module is further configured to: determine that the captured image includes indication of a code scanning module, wherein responsive to the determining that the captured image includes indication of a code scanning module, the capturing an image, the determining that the image includes the feature of the code scanning module, and the calculating an offset distance are performed repeatedly; and determine that a difference between a number of calculated offset distances is within a threshold, wherein the target presentation location is calculated responsive to the determining that a difference between a number of calculated offset distances is within a threshold.

9. The apparatus according to claim 7, wherein the image capture module is further configured to: responsive to detecting that the graphic code page is invoked, determine whether the apparatus has an image capture module; and responsive to determining that the current device has the image capture module, start the image capture module to perform image capturing.

10. The apparatus according to claim 7, wherein the image capture module is further configured to: responsive to detecting that the graphic code page is invoked, determine whether the apparatus has an image capture module; and responsive to determining that the apparatus does not have an image capture module, present the graphic code based on a presentation policy, the presentation policy including at least a policy for presenting the graphic code based on different presentation locations.

11. The apparatus according to claim 10, wherein presenting the graphic code based on the presentation policy includes: moving the graphic code up and down along a central symmetry axis of a screen of the apparatus.

12. The apparatus according to claim 10, wherein presenting the graphic code based on the presentation policy includes: setting a plurality of presentation locations and a presentation time interval; and presenting the graphic code at different presentation locations of the plurality of presentation locations based, at least in part, on the set presentation time interval.

13. A computer device, comprising a memory, a processor, and a computer program that is stored on the memory and that can run on the processor, the processor implementing a method when executing the program, the method comprises: detecting that a graphic code page is invoked on the computer device, the graphic code page including a graphic code; responsive to the detecting that the graphic code page is invoked, determining whether the computer device has a front-facing image capture module; and responsive to determining that the device has the front-facing image capture module; starting the front-facing image capture module to perform image capturing; capturing an image; determining that the captured image includes a feature of a code scanning module by performing image recognition on the captured image; calculating an offset distance between the code scanning module and a location of the graphic code as currently presented on the computer device; calculating a target location for presenting the graphic code on the computer device based, at least in part, on the offset distance; and presenting the graphic code at the target location.

14. The computer device according to claim 13, wherein the capturing an image includes: detecting that the computer device is in a still state and remains in the still state for a duration that exceeds a threshold; and wherein the performing image recognition is conducted responsive to the detecting.

15. The computer device according to claim 13, wherein the capturing an image, the determining that the image includes the feature of the code scanning module, and the calculating an offset distance are performed repeatedly, the method further comprising, responsive to determining that the device has the front-facing image capture module:
    determining that a difference between a number of calculated offset distances is within a threshold; and
    calculating the target location in response to the determining that the difference between the number of calculated offset distances is within the threshold.

16. The computer device according to claim 13, wherein the capturing an image includes: responsive to determining that the computer device does not have the front-facing image capture module, presenting the graphic code based on a presentation policy, the presentation policy including at least a policy for presenting the graphic code based on different presentation locations.

17. The computer device according to claim 16, wherein presenting the graphic code based on the presentation policy includes: setting a plurality of presentation locations and a presentation time interval; and presenting the graphic code at different presentation locations of the plurality of presentation locations based on the set presentation time interval.

* * * * *